Figure 1:
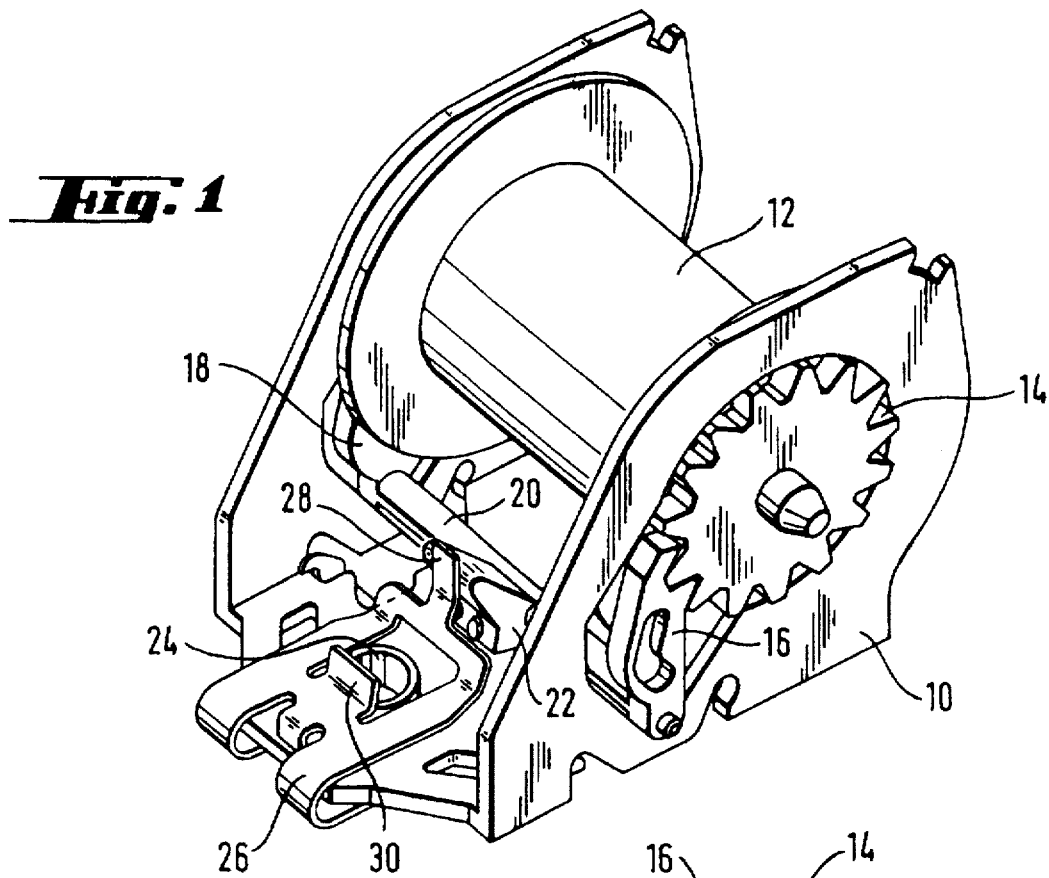

United States Patent [19]

Röhrle

[11] Patent Number: 5,740,979
[45] Date of Patent: Apr. 21, 1998

[54] TRANSPORT GUARD DEVICE FOR A BELT RETRACTOR

[75] Inventor: Martin Röhrle, Mutlangen, Germany

[73] Assignee: TRW Occupant Restraint Systems GmbH, Alfdorf, Germany

[21] Appl. No.: 704,667

[22] PCT Filed: Jan. 19, 1996

[86] PCT No.: PCT/EP96/00227

§ 371 Date: Sep. 12, 1996

§ 102(e) Date: Sep. 12, 1996

[87] PCT Pub. No.: WO96/22201

PCT Pub. Date: Jul. 25, 1996

[30]     Foreign Application Priority Data

Jan. 19, 1995 [DE] Germany ............. 295 00 817.2

[51] Int. Cl.⁶ ................................................. B60R 22/40
[52] U.S. Cl. ........................ 242/382; 242/384; 280/806
[58] Field of Search ............................. 242/382, 384.7, 242/384, 384.1, 384.2, 384.3, 384.4, 384.5, 384.6; 280/806; 297/478, 480

[56]                    References Cited

U.S. PATENT DOCUMENTS

| 3,312,451 | 4/1967  | Davis          | 242/384.7 |
| 3,915,402 | 10/1975 | Takada         | 242/382   |
| 4,088,280 | 5/1978  | Arlauskas et al. | 242/384.7 |
| 4,427,164 | 1/1984  | Rumpf          | 242/384.7 |
| 4,955,638 | 9/1990  | Kinoshita et al. |         |
| 5,149,134 | 9/1992  | Fohl .          |           |
| 5,507,523 | 4/1996  | Nishizawa et al. | 280/806 |

FOREIGN PATENT DOCUMENTS

| 0456853  | 11/1991 | European Pat. Off. . |
| 0529501  | 3/1993  | European Pat. Off. . |
| 2927159  | 2/1981  | Germany . |
| 3600003  | 7/1987  | Germany . |
| 29507113 | 8/1995  | Germany . |

Primary Examiner—John M. Jillions
Attorney, Agent, or Firm—Tarolli, Sundheim, Covell, Tummino & Szabo

[57] ABSTRACT

A transport guard device for a belt retractor for safety belts, more particularly a belt retractor with an integrated belt pretensioner drive, wherein the belt drum, which is rotatably supported in a housing and is provided with ratchet teeth means, is able to be locked against rotation by a pawl and the housing is secured on the vehicle by means of a bolt, is characterized in that a clip (26) is provided on the housing (10) and has a resiliently elastic limb (28) engaging the pawl (16, 18) and holding same in engagement with the ratchet teeth (14) on the belt drum (12) and that the resiliently elastic limb (28) is pivoted by the bolt (25) out of position away from the pawl during assembly of the belt retractor. Due to this design, no belt webbing can be withdrawn from the belt reel when the belt retractor is not mounted in a vehicle. This is particularly advantageous with belt retractors in which the pretensioner drive cannot be triggered as long as no belt webbing is withdrawn from the belt reel.

2 Claims, 1 Drawing Sheet

TRANSPORT GUARD DEVICE FOR A BELT RETRACTOR

The invention relates to a transport guard device for a belt retractor for safety belts, more particularly a belt retractor with an integrated belt pretensioner drive, in the case of which the belt drum, which is rotatably supported in a housing and is provided with ratchet teeth means, is able to be locked against rotation by a pawl and the housing is secured on the vehicle by means of a bolt.

When there is a crash belt pretensioners are tripped by an acceleration sensor. The tripping of a belt pretensioner on an unoccupied seat, or if the safety belt is not being used, is obviously undesired. By sensing the size of the coil of belt it is possible to determine whether a safety belt is being used or not. If the belt webbing is completely wound up on the belt drum, operation of the acceleration sensor can be barred, so that tripping of the belt pretensioner can not take place.

The invention in addition ensures that no unintended tripping of the belt pretensioner may occur during shipping. In accordance with the invention a clip is provided on the housing of the belt retractor and has a resiliently elastic limb engaging the pawl and holding same in engagement with the ratchet teeth on the belt drum, the resiliently elastic limb being pivoted by the bolt out of position away from the pawl during assembly of the belt retractor. Since before the belt retractor is installed in the vehicle the pawl locks such drum, no belt webbing may be drawn off. Accordingly, operation of the acceleration sensor is inhibited as well. Tripping of the belt pretensioner is consequently impossible. It is only on fitting the belt retractor in a vehicle by means of the attachment bolt that the pawl is released.

In accordance with an advantageous embodiment of the invention the clip is designed integrally with a U-shaped member and attached by same to the housing. The U-shaped member is only slidingly clipped onto the housing and does not require any further attachment means.

Further features and advantages of the invention will be understood from the following description of a preferred embodiment thereof in conjunction with the drawings, to which reference is made.

Figure 2:
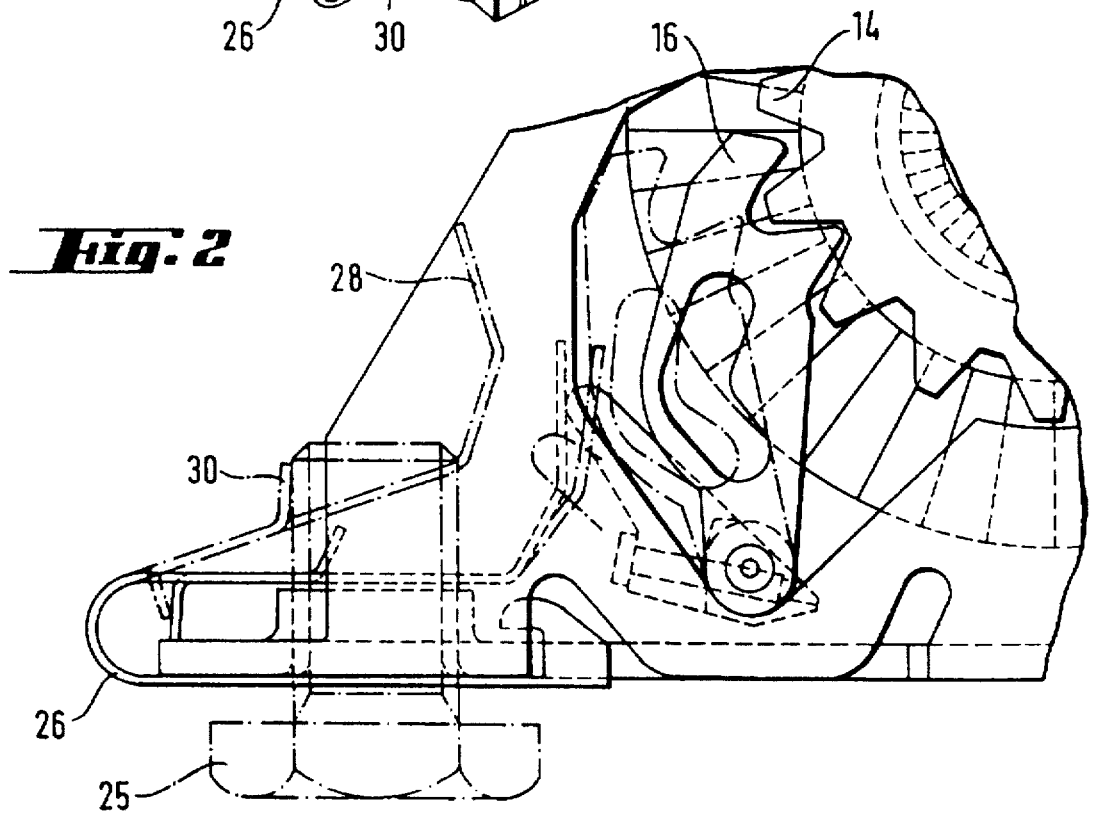

FIG. 1 is a perspective elevation of a belt retractor with a transport guard device; and FIG. 2 is a diagrammatic side view of the same belt retractor during installation.

In a conventional manner the belt retractor comprises a belt drum 12 rotatably supported in a housing 10 and having ratchet teeth 14 molded onto its lateral flanges. In the housing 10 two pawls 16 and 18 are pivotally mounted which are connected rigidly together by a rod 20. On this rod 20 an actuating lever 22 is formed.

The housing 10 possesses a round through opening 24 for a bolt 25 by means of which the housing is attached to the vehicle bodywork. A clip 26 of spring steel consists of a U-shaped member clipped on the housing 10 and of a resiliently elastic limb 28, which thrusts against the actuating arm 22 and holds the pawls 16 and 18 in engagement with the ratchet teeth 14.

Two lateral arms of the clip flank the opening 24, and the clip possesses a molded on lug 30, which overlaps the passage constituted by the opening 24. As shown in FIG. 2, during assembly of the belt retractor the bolt 25 presses against this lug 30 with the result that the resiliently elastic limb 28 is thrust away from the actuating arm 22. The locking pawls 16 and 18 are now released and are pivoted out of engagement with the ratchet teeth 14 by means of a return spring.

I claim:

1. A transport guard device for a belt retractor for safety belts, more particularly a belt retractor with an integrated belt pretensioner drive, wherein the belt drum, which is rotatably supported in a housing and is provided with ratchet teeth means, is able to be locked against rotation by a pawl and the housing is secured on the vehicle by means of a bolt, characterized in that a clip (26) is provided on the housing (10) and has a resiliently elastic limb (28) engaging the pawl (16, 18) and holding same in engagement with the ratchet teeth (14) on the belt drum (12) and in that the resiliently elastic limb (28) is pivoted by the bolt (25) out of position away from the pawl during assembly of the belt retractor.

2. The transport guard device as claimed in claim 1, characterized in that the clip (26) is designed integrally with a U-shaped member by which it is secured to the housing (10).

* * * * *